(12) United States Patent
Chilton (10) Patent No.: US 12,485,887 B2
(45) Date of Patent: Dec. 2, 2025

(54) COLLISION AWARE PATH PLANNING SYSTEMS AND METHODS

(71) Applicant: TORC Robotics, Inc., Blacksburg, VA (US)

(72) Inventor: Ryan Chilton, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 301 days.

(21) Appl. No.: 18/194,243

(22) Filed: Mar. 31, 2023

(65) Prior Publication Data

US 2024/0208492 A1    Jun. 27, 2024

Related U.S. Application Data

(60) Provisional application No. 63/434,850, filed on Dec. 22, 2022.

(51) Int. Cl.
*B60W 30/095* (2012.01)
*B60W 30/09* (2012.01)
*B60W 60/00* (2020.01)

(52) U.S. Cl.
CPC .......... *B60W 30/095* (2013.01); *B60W 30/09* (2013.01); *B60W 60/0015* (2020.02);
(Continued)

(58) Field of Classification Search
CPC .............. B60W 30/095; B60W 30/09; B60W 60/0015; B60W 2554/20; B60W 2554/402; B60W 2554/80; B60W 30/0956
See application file for complete search history.

(56) References Cited

U.S. PATENT DOCUMENTS 9,776,632 B2 * 10/2017 Bowers ............. B60W 30/0956
10,372,130 B1 *  8/2019 Kaushansky .......... B60K 35/26
(Continued)

FOREIGN PATENT DOCUMENTS

WO    WO-2017/079349 A1    5/2017
WO    WO-2017/079460 A2    5/2017

OTHER PUBLICATIONS

Zenzerovic, Paolo, and Zlatan Car. "Vehicle beam light assistant system." Annals of DAAAM & Proceedings (2011): 1653-1655. (Year: 2011).*

*Primary Examiner* — Russell Frejd
*Assistant Examiner* — Ana D Thomas
(74) *Attorney, Agent, or Firm* — Armstrong Teasdale LLP (57) ABSTRACT

Systems and methods for path planning for autonomous vehicles err on the side of a safer road position and safer type of collision if one were to occur. An autonomous vehicle perception module detects target objects within a region of interest (ROI). An autonomous vehicle processor estimates relative velocity between the ego vehicle and target objects, and estimates mass of target objects. Collision-aware path planning calculates a cost function that assigns higher costs for paths that take the vehicle close to objects that have a large velocity difference and higher costs for objects with large estimated mass. Path planning provides a cost map that yields a path that has appropriate buffer distances between the autonomous vehicle and surrounding objects. In the event the ego vehicle balances buffer distance margins to multiple surrounding target objects, target objects that would create more severe collisions are given greater buffer distance.

16 Claims, 6 Drawing Sheets

(52) U.S. Cl.
CPC ... *B60W 2554/20* (2020.02); *B60W 2554/402* (2020.02); *B60W 2554/80* (2020.02)

(56) References Cited

U.S. PATENT DOCUMENTS

| | | |
|---|---|---|
| 2004/0061598 A1 | 4/2004 | King |
| 2017/0120904 A1 | 5/2017 | Kentley et al. |
| 2021/0347382 A1* | 11/2021 | Huang ................ G05D 1/0212 |

* cited by examiner

COLLISION AWARE PATH PLANNING SYSTEMS AND METHODS

CROSS-REFERENCE TO RELATED APPLICATIONS

This application claims priority to U.S. Provisional Patent Application Ser. No. 63/434,850, filed Dec. 22, 2022, which is incorporated by reference in its entirety.

TECHNICAL FIELD

The present disclosure relates generally to autonomous vehicles and, more specifically, to systems and methods for autonomous vehicle operation.

BACKGROUND

Path planning on roads is a central problem for autonomous vehicles. Path planners are responsible for using a variety of information and constraints to determine a path that satisfies these requirements and minimizes various error metrics. The task of path planning for vehicles on roads is interesting because collisions, while undesirable, are sometimes unavoidable. This makes it important to come up with a planned path that will minimize the severity of a collision if one were to occur.

SUMMARY

The systems and methods of the present disclosure may solve one or more of the problems set forth above and/or other problems in the art. The scope of the current disclosure, however, is defined by the attached claims, and not by the ability to solve any specific problem.

Disclosed embodiments for autonomous vehicle operation err on the side of a safer road position and safer type of collision if one were to occur. An autonomous vehicle perception module detects target objects within a region of interest (ROI). Autonomous vehicle processor estimates relative velocity between the ego vehicle and surrounding inanimate objects, and estimates effective mass of surrounding inanimate objects. Collision-aware path planning calculates a cost function that assigns higher costs for paths that take the vehicle close to objects that have a large velocity difference and higher costs for objects with large estimated mass. Path planning provides a cost map that yields a path that has appropriate buffer distances between the autonomous vehicle and surrounding objects. In the event the ego vehicle balances buffer distance margins to multiple surrounding inanimate objects, inanimate objects that could create more severe collisions are given greater buffer distance.

In one embodiment, a collision analysis module may include a velocity estimator, effective mass estimator, object visual parameters component, inanimate object classification component and cost function analysis module. The collision analysis module may execute an artificial intelligence model to predict one or more attributes of detected target objects. The cost function analysis module receives inputs from other collision analysis components and generates a collision-aware cost function. Path planning may apply this collision-aware cost function in conjunction with other functions used in path planning. In an embodiment, the cost function analysis module provides a cost map that yields a path that has appropriate margins between the autonomous vehicle and surrounding target objects.

In another embodiment, a system may collect data on target objects within a predetermined Region of Interest (ROI) in proximity to the ego vehicle. Target objects may include moving objects such as other vehicles, pedestrians, and cyclists in the proximal driving area. Target objects may include static objects such as obstacles, infrastructure objects such as rigid poles, guardrails or other traffic barriers, and parked cars. Target objects within the ROI satisfy predetermined criteria for likelihood of collision with the ego vehicle. The ROI may be defined with reference to parameters of the vehicle control module in planning and executing maneuvers and/or routes with respect to the features of the environment. The ROI may include locations within a lane, as well as other locations that may enter the ego vehicle's drive path in the event of crossing lanes, accessing a road junction, swerve maneuvers, or other maneuvers or routes of the ego vehicle.

In yet another embodiment, a cost function may assign high costs for paths that take the vehicle close to objects that have a large velocity difference. Paths that are farther from those high-relative-velocity objects or close to objects of similar velocities are less costly. Similarly, the estimated effective mass of a static object provides a high cost for collision like objects with large mass. As applied to an autonomous vehicle with a plurality of surrounding objects, calculated cost value may provide a cost map that yields a path that has appropriate margins between the autonomous vehicle and the surrounding objects.

In another embodiment, a method may comprise receiving, by a processor associated with an autonomous vehicle, an indication that a current trajectory of the autonomous vehicle is associated with a likelihood of a collision that satisfies a threshold indicating a potential collision; identifying, by the processor, an alternative trajectory for the vehicle; when the alternative trajectory has a likelihood of collision that satisfies the threshold indicating a potential collision, calculating, by the processor, a cost value for the current trajectory and the alternative trajectory; and transmitting, by the processor, an input of a trajectory having a lowest cost value to a vehicle control module of the autonomous vehicle.

In another embodiment, a method may comprise identifying, by a processor associated with an autonomous vehicle, a plurality of target objects in collision proximity to the autonomous vehicle; executing, by the processor, an artificial intelligence model to predict a plurality of predetermined attributes of each of the plurality of target objects relative to the autonomous vehicle; calculating, by the processor, a total cost value representing a total of respective cost values incurred from each of the plurality of target objects based on the plurality of predicted attributes; and transmitting to a vehicle control module of the autonomous vehicle, by the processor, an input of a vehicle pose having a lowest total cost value.

In another embodiment, a system may comprise a non-transitory computer-readable medium comprising instructions that are configured to be executed by at least one processor associated with an automated vehicle to: receive an indication that a current trajectory of the autonomous vehicle is associated with a likelihood of a collision that satisfies a threshold indicating a potential collision; identify an alternative trajectory for the vehicle; when the alternative trajectory has a likelihood of collision that satisfies the threshold indicating a potential collision, calculate a cost value for the current trajectory and the alternative trajectory; and transmit an input of a trajectory having a lowest cost value to a vehicle control module of the autonomous vehicle.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Collision warning systems are becoming more widely used in vehicles with drivers. Collision warning systems can provide a vehicle operator increased knowledge and awareness of threatening objects or vehicles within a close proximity so as to reduce the probability of colliding with those objects. In addition, conventional collision warning systems and countermeasure systems for vehicles with drivers can reduce the energy imparted in a potential collision, thereby to mitigate damage and injury.

The systems and methods of the present disclosure address these considerations in the field of autonomous vehicles. The embodiments herein relate to autonomous vehicle systems, which require little or no human interaction to operate the vehicle and navigate it from an origin location to a destination location. The embodiments may also be applied to simpler, semi-autonomous systems, such as advanced driver assistance systems (ADAS).

A goal is to always provide a path that avoids collisions, but since it is possible to fail at this due to external disturbance or perception or execution error, it is important to create a path that will err on the side of a safer road position and safer type of collision if one were to occur. The general idea to come up with a path that will minimize the severity of a potential collision by considering the collision severity of different objects. If the vehicle needs to balance the distance margins provided to multiple objects, then objects that would create more severe collisions should be given more buffer distance than objects that would result in less severe collisions.

Two estimates may be provided: (1) a relative velocity between the ego vehicle and the object; and (2) an estimated strength or effective mass of the object.

The rationale is that colliding with a concrete barrier would be much more severe and would result in more collisions overall from the ensuing rollover or jack-knife situation than colliding with a vehicle moving alongside the autonomous vehicle with roughly the same velocity. Similarly, colliding with a parked vehicle would be much more catastrophic than colliding with a plastic or even metal flex stake. On the other hand, colliding with a vehicle moving in the opposite direction than the autonomous vehicle would generally result in a catastrophic collision. Not all objects should be treated equally when deciding how much leeway to provide. The concept is essentially a method for determining appropriate buffer distances for planning around different types of moving objects and non-moving objects. To humans, this type of driving behavior would feel natural and rational.

To accomplish this collision-aware planning, a cost function is created. This cost function will then be used in conjunction with the other cost functions typically used in path planning such as cross track error. In an embodiment, collision-aware planning generates a cost map that yields a path with appropriate buffer distances between the autonomous vehicle and surrounding objects.

Figure 1:
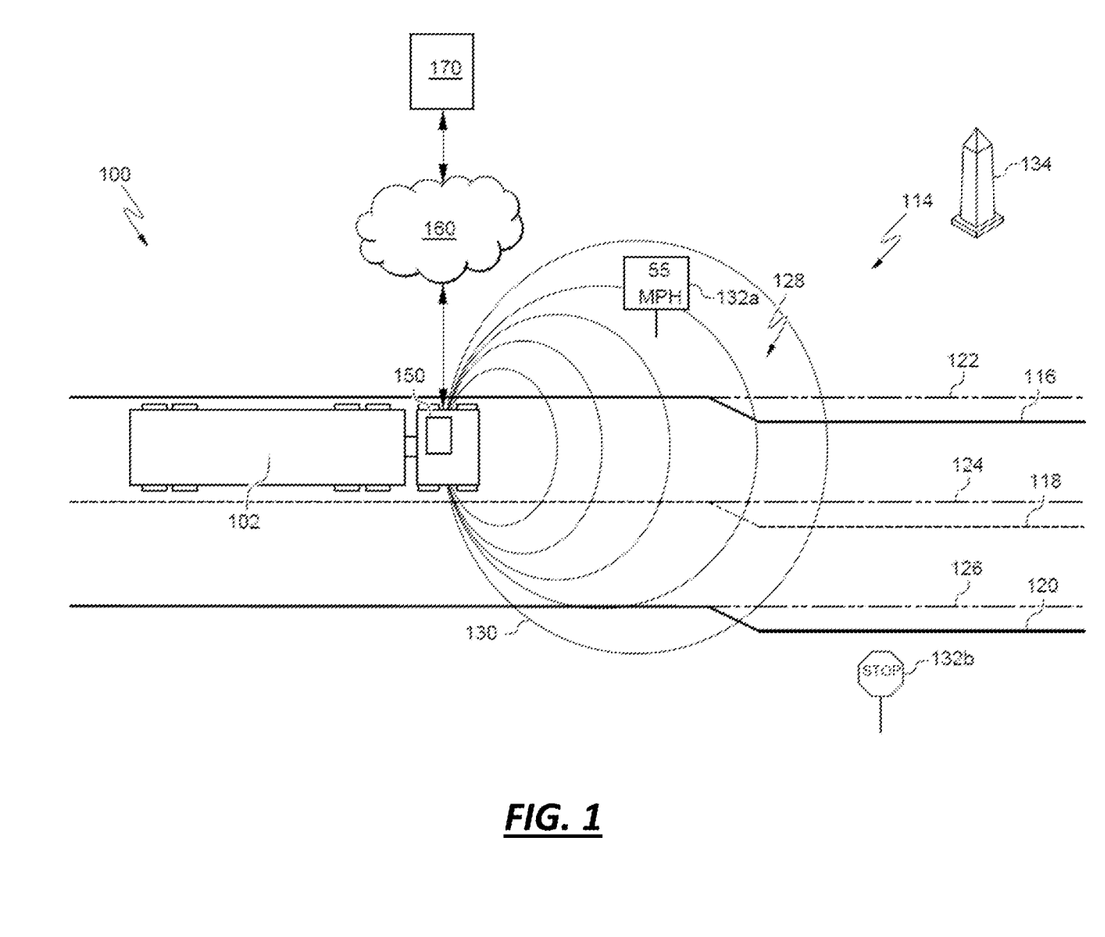
FIG. 1 is a bird's eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. The present disclosure sometimes refers to autonomous vehicles as ego vehicles. The autonomy system 150 may be structured on at least three aspects of technology: (1) perception, (2) maps/localization, and (3) behaviors planning and control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, etc.) and features of the roadway (e.g., lane lines) around truck 102, and classify the objects in the road distinctly.

The maps/localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map.

Once the systems on the truck 102 have determined its location with respect to the digital map features (e.g., location on the roadway, upcoming intersections, road signs, etc.), the truck 102 can plan and execute maneuvers and/or routes with respect to the features of the digital map. The behaviors, planning, and control aspects of the autonomy system 150 may be configured to make decisions about how the truck 102 should move through the environment to get to its goal or destination. It may consume information from the perception and maps/localization modules to know where it is relative to the surrounding environment and what other objects and traffic actors are doing.

FIG. 1 further illustrates an environment 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (i.e., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous having varying degrees of autonomy or autonomous functionality.

Figure 2:
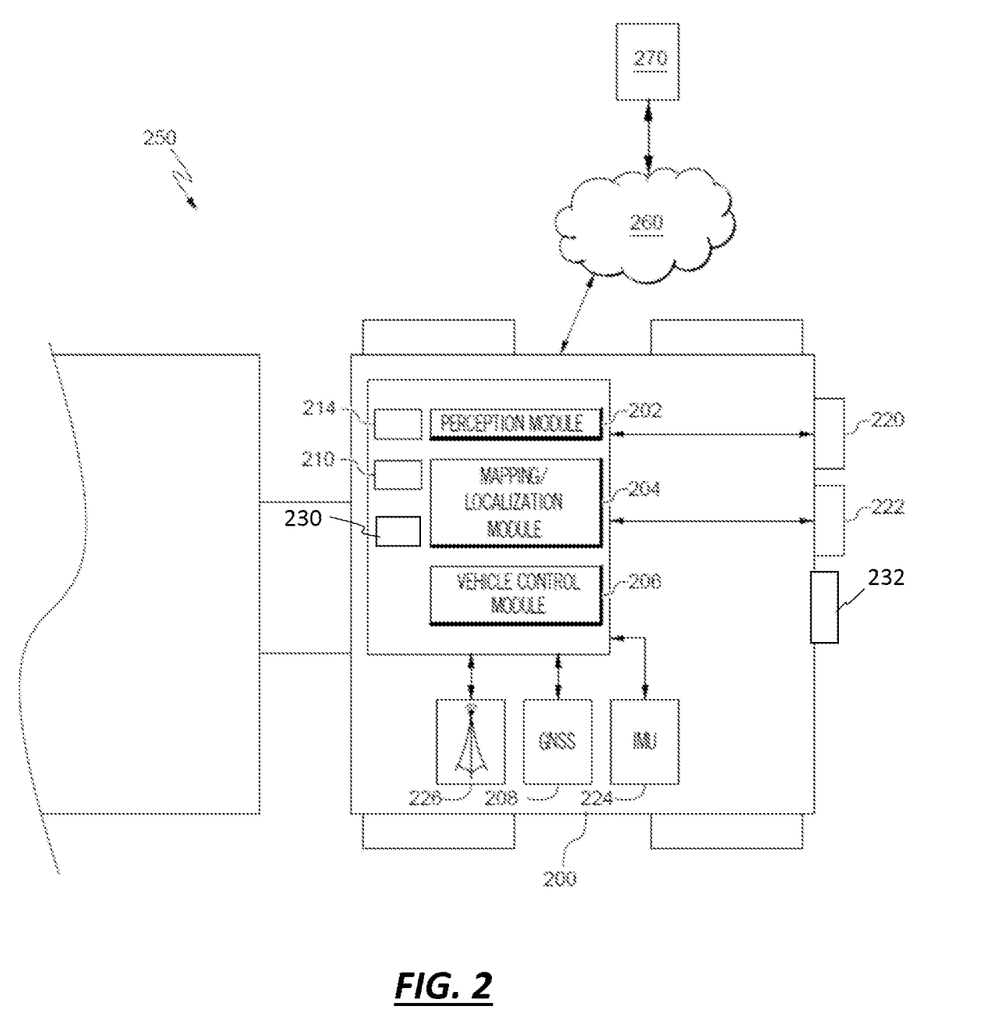
FIG. 2 is a schematic of the autonomy system of the vehicle, according to an embodiment.

With reference to FIG. 2, an autonomy system 250 may include a perception system including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As show in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., forward of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive a LiDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may estimate strength or effective mass of an object, as objects made out of paper or plastic may be weakly detected. The radar system 232 may be based on 24 GHZ, 77 GHZ, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5 g, etc.) In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand. In some embodiments, the truck 200 may not be in constant communication with the network 260 and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck 260. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck 260. Various other known circuits may be associated with the autonomy system 250, including signal-conditioning circuitry, communication circuitry, actuation circuitry, and other appropriate circuitry.

Figure 5:
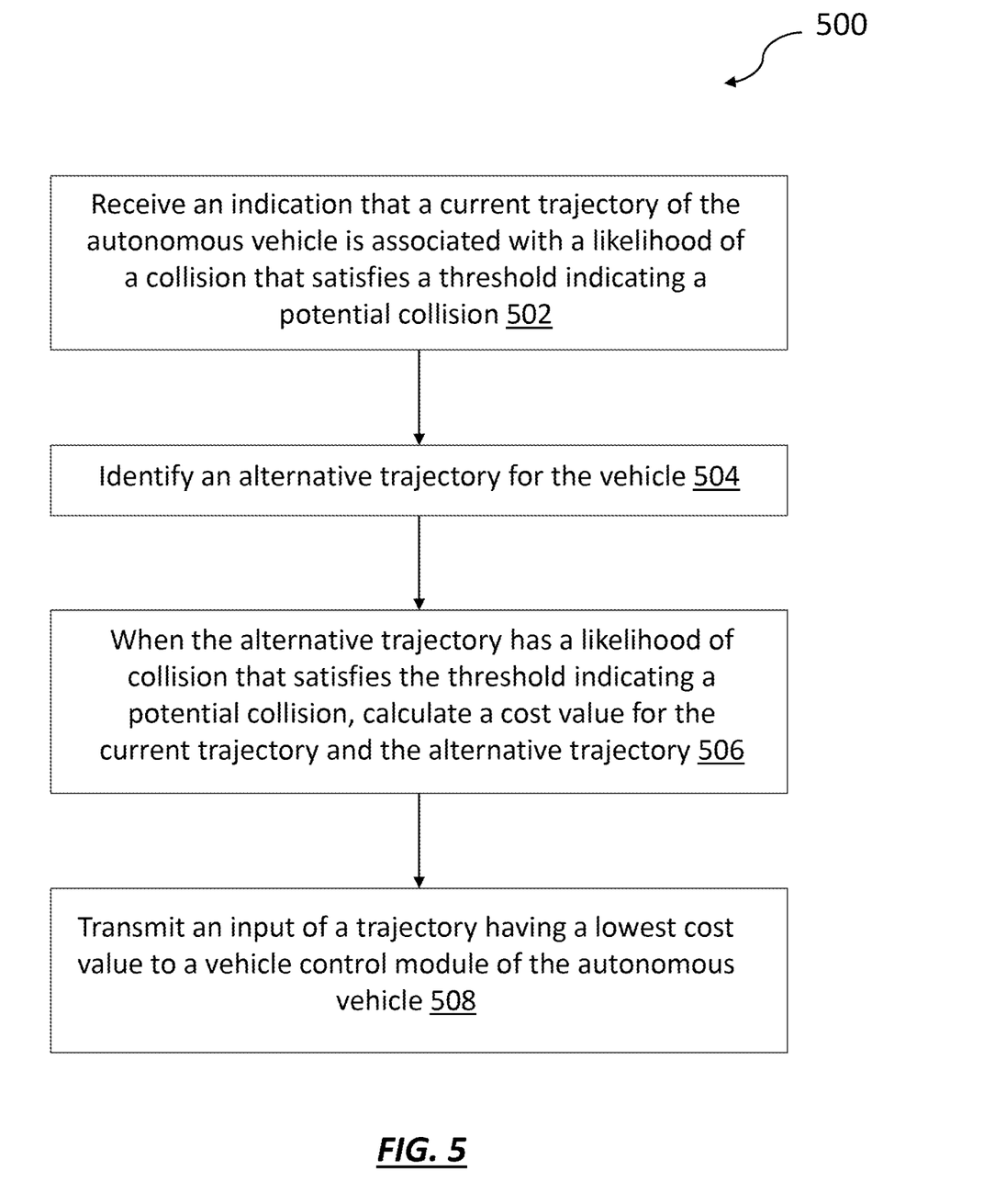
FIG. 5 is a process for using the autonomy system of the vehicle, according to an embodiment.
Figure 6:
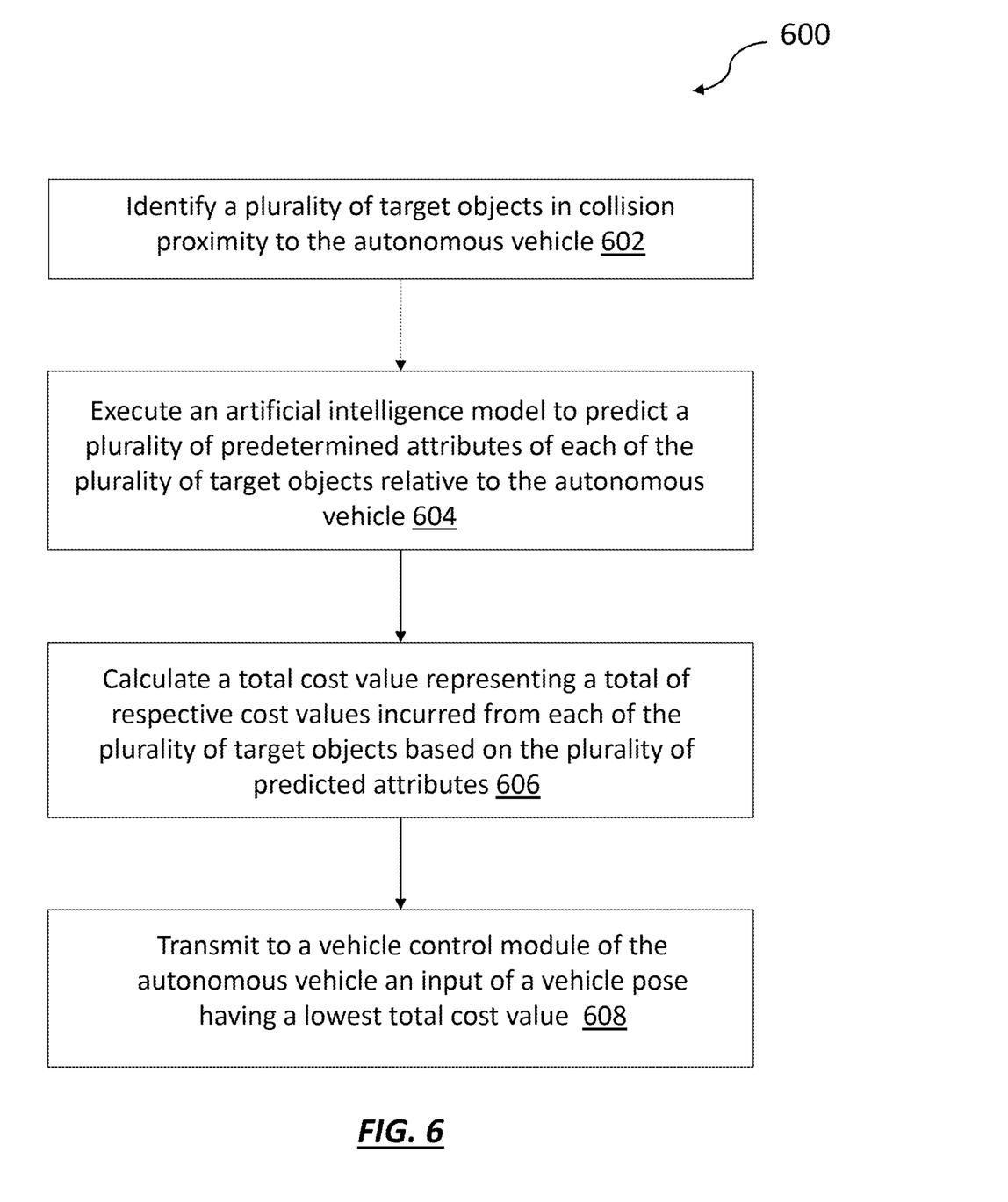
FIG. 6 is a process for using the autonomy system of the vehicle, according to an embodiment.

The memory 214 of autonomy system 250 may store data and/or software routines that may assist the autonomy system 250 in performing its functions, such as the functions of the perception module 202, the mapping/localization module 204, the vehicle control module 206, a collision analysis module 230, the method 500 described herein with respect to FIG. 5, and the method 600 described herein with respect to FIG. 6. Further, the memory 214 may also store data received from various inputs associated with the autonomy system 250, such as perception data from the perception system.

As noted above, perception module 202 may receive input from the various sensors, such as camera system 220, LiDAR system 222, GNSS receiver 208, and/or IMU 224 (collectively "perception data") to sense an environment surrounding the truck 260 and interpret it. To interpret the surrounding environment, the perception module 202 (or "perception engine") may identify and classify objects or groups of objects in the environment. For example, the truck 102 may use the perception module 202 to identify one or more objects (e.g., pedestrians, vehicles, debris, etc.) or features of the roadway 114 (e.g., intersections, road signs, lane lines, etc.) before or beside a vehicle and classify the objects in the road. In some embodiments, the perception module 202 may include an image classification function and/or a computer vision function.

The system 100 may collect perception data. The perception data may represent the perceived environment surrounding the vehicle, for example, and may be collected using aspects of the perception system described herein. The perception data can come from, for example, one or more of the LiDAR system, the camera system, and various other externally-facing sensors and systems on board the vehicle (e.g., the GNSS receiver, etc.). For example, on vehicles having a sonar or radar system, the sonar and/or radar systems may collect perception data. As the truck 102 travels along the roadway 114, the system 100 may continually receive data from the various systems on the truck 102. In some embodiments, the system 100 may receive data periodically and/or continuously. With respect to FIG. 1, the truck 102 may collect perception data that indicates presence of the lane lines 116, 118, 120. Features perceived by the vehicle should generally track with one or more features stored in a digital map (e.g., in the mapping/localization module 204). Indeed, with respect to FIG. 1, the lane lines that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario the vehicle approaches a new bend 128 in the road that is not stored in any of the digital maps onboard the truck 102 because the lane lines 116, 118, 120 have shifted right from their original positions 122, 124, 126.

The system 100 may compare the collected perception data with stored data. For example, the system may identify and classify various features detected in the collected perception data from the environment with the features stored in a digital map. For example, the detection systems may detect the lane lines 116, 118, 120 and may compare the detected lane lines with lane lines stored in a digital map. Additionally, the detection systems could detect the road signs 132a, 132b and the landmark 134 to compare such features with features in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 100 interacts with the various features. Based on the comparison of the detected features with the features stored in the digital map(s), the system may generate a confidence level, which may represent a confidence of the vehicle in its location with respect to the features on a digital map and hence, its actual location.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.)

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200, and may correlate features of the sensed environment with details (e.g., digital representations of the features of the sensed environment) on the one or more digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connection to an external network during the mission. A centralized mapping system may be accessible via network 260 for updating the digital map(s) of the mapping/localization module 204. The digital map be built through repeated observations of the operating environment using the truck 200 and/or trucks or other vehicles with similar functionality. For instance, the truck 200, a specialized mapping vehicle, a standard autonomous vehicle, or another vehicle, can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it onboard and use it within its mapping/localization module 204. Hence, the truck 200 and other vehicles (e.g., a fleet of trucks similar to the truck 200) can generate, maintain (e.g., update), and use their own generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck 260. For example, once the systems on the truck 260 have determined its location with respect to map features (e.g., intersections, road signs, lane lines, etc.) the truck 260 may use the vehicle control module 206 and its associated systems to plan and execute maneuvers and/or routes with respect to the features of the environment. The vehicle control module 206 may make decisions about how the truck 260 will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck 260 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck 260. The steering system may be any combination of mechanisms configured to adjust the heading or direction of the truck 260. The brake system may be, for example, any combination of mechanisms configured to decelerate the truck 260 (e.g., friction braking system, regenerative braking system, etc.) The vehicle control module 206 may be configured to avoid obstacles in the environment surrounding the truck 260 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

In disclosed embodiments of a system for planning paths that will minimize the severity of a collision, the system 100, 250 collects perception data on objects that satisfy predetermined criteria for likelihood of collision with the ego vehicle. Such objects are sometimes referred to herein as target objects. Collected perception data on target objects may be used in collision analysis.

Figure 3:
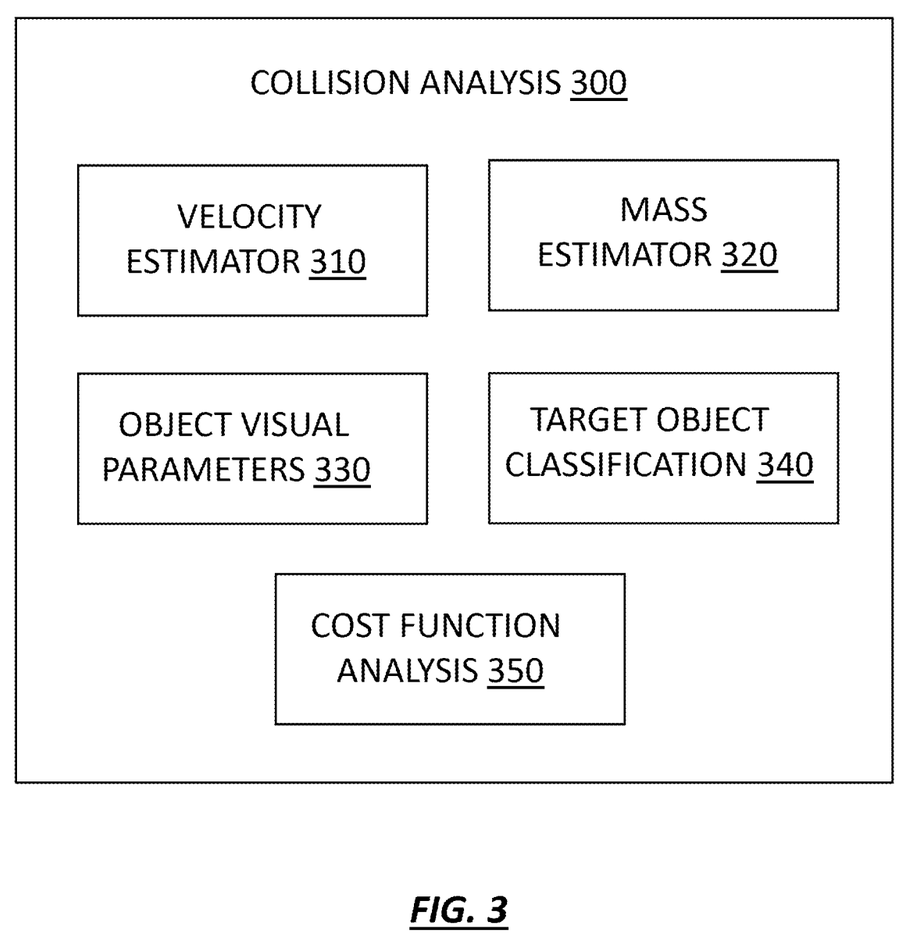
FIG. 3 is a schematic diagram of a collision analysis module of the autonomy system of the vehicle, according to an embodiment.

FIG. 3 shows a Collision Analysis module 300 of system 100, 250. Collision Analysis module 300 includes Velocity Estimator 310, Effective Mass Estimator 320, Object Visual Parameters component 330, Target Object Classification component 340, and Cost Function Analysis module 350. These components of Collision Analysis module 300 may be either or both software-based components and hardware-based components.

In an embodiment, collision analysis module 230, 300 executes an artificial intelligence model to predict one or more attributes of detected target objects. The artificial intelligence model may be configured to ingest data from at least one sensor of the autonomous vehicle and predict the attributes of the object. In an embodiment, the artificial intelligence module is configured to predict a plurality of predetermined attributes of each of a plurality of detected target objects relative to the autonomous vehicle. The predetermined attributes may include a relative velocity of the respective target object relative to the autonomous vehicle and an effective mass attribute of the respective target object. In an embodiment, the artificial intelligence model is a predictive machine learning model that may be continuously trained using updated data, e.g., relative velocity data, mass attribute data, and target objects classification data. In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

Velocity Estimator 310 may determine relative velocity of target objects relative to the ego vehicle. Effective Mass Estimator 320 may estimate effective mass of target objects, e.g., based on object visual parameters signals from Object Visual Parameters component 330 and object classification signals from Target Object Classification component 340. Object Visual Parameters component 330 may determine visual parameters of a target object such as size, shape, visual cues and other visual features in response to visual sensor signals, and generates an object visual parameters signal. Target Object Classification component 340 may determine a classification of a target object using information contained within the object visual parameters signal which may be correlated to various objects, and generates an object classification signal. Cost Analysis Function module 350 may receive inputs from other components of Collision Analysis module 300 and generates a collision-aware cost function. The system 100, 250 may apply this collision-aware cost function in conjunction with other functions used in path planning. In an embodiment, Cost Analysis Function module provides a cost map that yields a path that has appropriate margins between the autonomous vehicle and surrounding target objects.

Target objects may include moving objects such as other vehicles, pedestrians, and cyclists in the proximal driving area. Target objects may include fixed objects such as obstacles; infrastructure objects such as rigid poles, guardrails or other traffic barriers; and parked cars. Fixed objects, also herein referred to herein as static objects and non-moving objects, can be infrastructure objects as well as temporarily static objects such as parked cars. Systems and methods herein may aim to choose a collision path that may involve a surrounding inanimate object. The systems and methods aim to avoid a vulnerable pedestrian, bicyclist, motorcycle, or other targets involving people or animate beings, and this avoidance is a priority over a collision with an inanimate object.

Externally-facing sensors may provide system 100, 250 with data defining distances between the ego vehicle and target objects in the vicinity of the ego vehicle, and with data defining direction of target objects from the ego vehicle. Such distances can be defined as distances from sensors, or sensors can process the data to generate distances from the center of mass or other portion of the ego vehicle.

In an embodiment, the system 100, 250 collects data on target objects within a predetermined region of interest (ROI) in proximity to the ego vehicle. Objects within the ROI satisfy predetermined criteria for likelihood of collision with the ego vehicle. The ROI is alternatively referred to herein as a region of collision proximity to the ego vehicle. The ROI may be defined with reference to parameters of the vehicle control module 206 in planning and executing maneuvers and/or routes with respect to the features of the environment. In an embodiment, there may be more than one ROI in different states of the system 100, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

Figure 4:
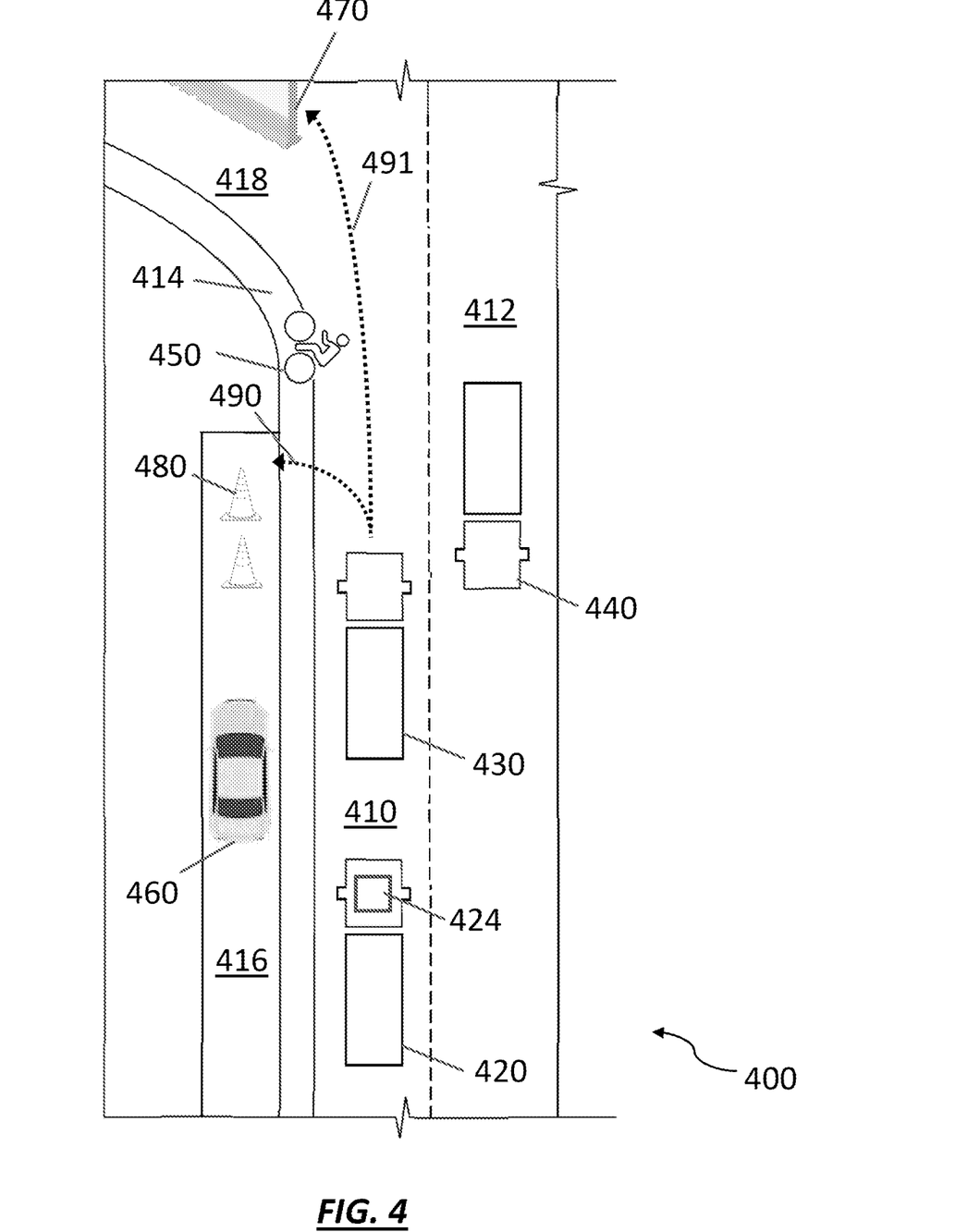
FIG. 4 is a bird's eye view of a roadway scenario including a schematic representative of an autonomous vehicle and various target objects in a region of collision proximity to the autonomous vehicle, according to an embodiment.

FIG. 4 is a bird's eye view of a roadway scenario 400 including a schematic representative of an autonomous vehicle 420 and various target objects. Roadway scenario 400 includes a two-lane roadway with a first lane 410 with traffic flow in a first direction and a second lane 412 with traffic flow in the opposite direction. A bike lane 414 and a parking lane 416 are located adjacent the first lane 410. An exit lane or ramp 418 exits from the first lane 410. Autonomous vehicle 420 is traveling in the first lane 410 and contains an autonomy system 424 configured to detect target objects in a region of collision proximity to the autonomous vehicle 420. Target objects include various moving objects including a first vehicle 430 ahead of the autonomous vehicle in the first lane 410, a second vehicle traveling in the opposite direction in the second lane 412, and a cyclist 450 in the bike lane 414. Target objects include static objects, including a parked vehicle 460 in the parking lane 416, a rigid concrete traffic barrier 470 at the junction of the exit lane 418 and the first lane 410, and traffic cones (pylons) 480 in the parking lane 416. During travel of the autonomous vehicle through the roadway scenario, autonomy system 424 senses surrounding target objects 430, 440, 450, 460, 470, 480. Autonomy system 424 executes the collision aware path planner of the disclosure to come up with a planned path intended to minimize the severity of a collision if one were to occur. In an embodiment, the collision aware path planner generates a cost map that yields a path that has appropriate margins between the autonomous vehicle 420 and the various target objects 430, 440, 450, 460, 470, 480.

The autonomous vehicle 420 may encounter a situation where it has two potential paths 490, 491 to avoid hitting other vehicles or pedestrians. When comparing potential paths 490, 491 of the autonomous vehicle 420, the autonomy system 424 may evaluate the traffic cones 480 along path 490 and the concrete traffic barrier 470 along path 491. Because the concrete traffic barrier 470 may be predicted to have a higher cost of impact, the autonomy system 424 may direct the autonomous vehicle 420 along path 490 instead. Similarly, the autonomous vehicle 420 may evaluate more than two potential paths to avoid hitting other vehicles or pedestrians and to identify a safer type of collision if one were to occur.

In disclosed embodiments, during motion of an ego vehicle, the system 100, 250 continuously collects perception data identifying target objects that satisfy predetermined criteria for likelihood of collision with the ego vehicle. Over time, the system continuously identifies updated sets of target objects in collision proximity to the autonomous vehicle. On an ongoing basis, an artificial intelligence model of the system 100, 250 analyzes attributes of target objects to plan paths that will minimize the severity of a collision if one were to occur. In disclosed embodiments, the artificial intelligence model estimates effective mass of identified target objects as a factor of potential severity of collisions with target objects. In estimating collision severity between an autonomous vehicle and an impending target object it can be useful to know or to estimate effective masses of both the ego vehicle and the target object. In disclosed embodiments, the artificial intelligence model estimates relative velocity of identified target objects relative to the ego vehicle. Relative velocity estimates can apply both to moving objects and static objects. Disclosed methods relate these attributes to collision severity of a potential collision event.

Velocity and mass of an ego vehicle can be readily obtainable. Current active electro-magnetic wave ranging devices such as LiDAR are capable of measuring velocity of objects. On the other hand, it can be very difficult to estimate the effective mass or strength of an object directly. In collecting perception data on target objects, the system 100, 250 may deploy multiple sensor types to increase the number and accuracy of measured object states and characteristics. This in turn increases measurement quality, which corresponds to better object classification and effective mass prediction.

Target object detection sensors may include camera system 220 and/or LiDAR system 222, among other sensor types. Camera system 220 may be used as a monocular or as a binocular (stereo) pair to obtain height, width, depth, distance, velocity, and other visual feature information of target objects. 2D object detectors provide bounding boxes with four degrees of freedom. 3D object detectors use 3D image data from one or more cameras (and optionally one or more ranging sensors) to detect objects. These detectors generate bounding boxes with six degrees of freedom, e.g., including (x, y, z) and/or (height, width, length). In an example, upon identifying a potentially collidable target object in the ROI, camera system 220 generates visual target object information. In addition to height, width and length information, visual object information also may include visual cues and visual features of target objects.

Wave-ranging devices may include LiDAR system 222, radar, cameras with active infrared illumination, or other wave-ranging devices known in the art. The wave-ranging devices may also detect height, width, depth, distance and velocity information of detected target objects. In an example, LiDAR system 222 generates ranging target object information upon detecting a potentially collidable target object.

In various embodiments, Velocity Estimator module 310 applies ranging target object information, which may include velocity information of the target object, distance between the ego vehicle and the target object, range rate of the target object relative to the ego vehicle, and angle of the target object relative to a centerline of the ego vehicle.

In various embodiments, Target Object Classification component 340 identifies a classification of a target object. Classification information may include average cross-sectional areas or volumes of objects in each particular class. Target Object Classification component 340 may generate an area signal or a volume signal in response to the object visual parameters signal.

Disclosed target object classification embodiments employ object detection, an advanced form of image classification in which a predictive algorithm (e.g., neural network) predicts objects in an image and defines them in the form of bounding boxes. Object detection may be employed to detect and localize target objects in an image. Object detection techniques may generate labels for target objects representative of a predefined set of classes pertinent to autonomous vehicle environments and roadway infrastructures. For example, object detection techniques may generate labels for different classes of moving objects and static objects. Object detection techniques may generate labels that distinguish between objects that include people and objects that do not include people.

The disclosed aspects of the system 100, 250, 300 of the present disclosure may be used to modify a vehicle action based on a confidence level of a classification of a detected target object in the environment surrounding the truck 102, 200.

In various embodiments, Effective Mass Estimator module 320 estimates the effective mass of target objects through the use of look-up tables containing the object classes corresponding to various object parameters and characteristics. Height, width, and length information may be used to determine area or volume of the target object to predict effective mass of the target object and to generate an object mass signal in response to the area signal or the volume signal. Look-up tables may provide mass estimates or mass ranges for object classes of static objects and moving objects in roadway environments and infrastructures. For instance, an orange traffic cone could be assigned a modest estimated mass typical of that object type, while a concrete bridge pillar could be given a very large estimated mass.

In an embodiment, the Cost Function Analysis module 350 calculates the following cost function at given pose or trajectory of the autonomous vehicle. The cost function assigns high costs for paths that take the vehicle close to objects that have a large velocity difference. Paths that are farther from those high-relative-velocity objects or close to objects of similar velocities are less costly. Similarly, higher estimated mass of a static object provides increased cost for paths that approach it more closely.

$$c_i(p) = \frac{k_1 \cdot \text{abs}(v_{rel,i}) + k_2 \cdot \text{mass}_i}{\text{dist}(i, p)}$$

$$e(p) = \sum c_{i(p)}$$

Where:
p is a vehicle pose at which to estimate the cost
$c_i(p)$ is the cost incurred from the $i^{th}$ object given a vehicle pose
e(p) is the total cost incurred from all objects at a given vehicle pose
$v_{rel,i}$ is the relative velocity between the ego and the $i^{th}$ object and the pose
$\text{mass}_i$ is the estimated mass or strength of the object
dist(i,p) is the distance between the $i^{th}$ object and the pose
$k_1$ and $k_2$ are tunable constants This cost function can be used in conjunction with other cost functions typically used in path planning such as cross track error and general object avoidance, which may give elevated costs around vulnerable road users. The goal is to provide a cost map that yields a path that has appropriate margins between the autonomous vehicle and surrounding objects.

FIG. 5 shows execution steps of a processor-based method using the system 100, 250, 300 according to aspects of the present disclosure. The illustrative method 500 shown in FIG. 5 comprises execution steps 502, 504, 506, 508. However, it should be appreciated that other embodiments may comprise additional or alternative execution steps, or may omit one or more steps altogether. It should also be appreciated that other embodiments may perform certain execution steps in a different order. Steps may also be performed simultaneously or near-simultaneously with one another.

At step 502, the autonomous vehicle processor receives an indication that a current trajectory of the autonomous vehicle is associated with a likelihood of a collision that satisfies a threshold indicating a potential collision. In an embodiment of step 502, the processor detects a target object in proximity to the autonomous vehicle and receives an indication that the current trajectory is associated with a likelihood of a collision that satisfies a threshold indicating a potential collision. In an embodiment of step 502, the processor detects a target object in proximity to the autonomous vehicle, estimates a margin (buffer distance) between the target object and the autonomous vehicle, and receives an indication that the current trajectory is associated with a likelihood of a collision that satisfies a threshold indicating a potential collision. In an embodiment, the processor detects a static target object in proximity to the autonomous vehicle and receives an indication that the current trajectory is associated with a likelihood of a collision with the static object that satisfies a threshold indicating a potential collision. In an embodiment, the processor detects a moving object in proximity to the autonomous vehicle and receives an indication that the current trajectory is associated with a likelihood of a collision with the moving object that satisfies a threshold indicating a potential collision, taking into predicted movement of the moving object.

In an embodiment of step 502, the processor detects a plurality of target objects in proximity to the autonomous vehicle and receives an indication that the current trajectory is associated with a likelihood of collision with at least one of the plurality of target objects that satisfies a threshold indicating a potential collision.

At step 504, the autonomous vehicle processor identifies an alternative trajectory for the autonomous vehicle. In an embodiment of step 504, the autonomous vehicle processor identifies a plurality of alternative trajectories of the autonomous vehicle. In an embodiment, the autonomous vehicle processor identifies an alternative trajectory that changes the direction of the trajectory for the autonomous vehicle. In an embodiment, the autonomous vehicle processor detects a target object in proximity to the autonomous vehicle, and identifies an alternative trajectory that reduces the velocity of the autonomous vehicle relative to the target object. In an embodiment, the autonomous vehicle processor detects a first target object and a second target object in proximity to the autonomous vehicle, and identifies an alternative trajectory that increases a margin between the autonomous vehicle and the first target object and that decreases a margin between the autonomous vehicle and the second target object.

At step 506, when the alternative trajectory has a likelihood of collision that satisfies the threshold indicating a potential collision, the autonomous vehicle processor calculates a cost value for the current trajectory and a cost value for the alternative trajectory. In an embodiment of step 506, the cost value is based on an attribute of an object associated with the potential collision. In an embodiment, the cost value is based on at least one of a mass, volume, density, or material of the object. In an embodiment, the autonomous vehicle processor executes an artificial intelligence model to predict the attribute of the object. The artificial intelligence model is configured to ingest data from at least one sensor of the autonomous vehicle and predict the attribute of the object. In an embodiment, the cost value is based on a speed of a second vehicle associated with the potential collision.

In an embodiment of step 506, the autonomous vehicle processor detects a target object in proximity to the autonomous vehicle, and the cost value for the current trajectory and cost value for the alternative trajectory each represent estimated severity of collision with the detected target object. In an embodiment, the calculated cost value represents estimated damage to the autonomous vehicle and/or estimated damage to a target object in proximity to the autonomous vehicle. In an embodiment, the autonomous vehicle processor detects one or more persons in proximity to the autonomous vehicle, and the cost value for the current trajectory and cost value for the alternative trajectory each represent estimated risk of injury to the one or more persons. In an embodiment, the autonomous vehicle processor detects a first target object and a second target object in proximity to the autonomous vehicle, and the cost value for the current trajectory and cost value for the alternative trajectory each represent an estimated severity of collision with the first target object and an estimated severity of collision with the second target object.

In an embodiment of step 506, the calculated cost value applies a cost function that assigns high costs for paths that take the vehicle close to objects that have a large velocity difference. Paths that are farther from those high-relative-velocity objects or close to objects of similar velocities are less costly. The estimated effective mass of a static object provides a higher cost for collision with objects with large mass. As applied to an autonomous vehicle with a plurality of surrounding objects, the calculated cost value may provide a cost map that yields a path that has appropriate margins between the autonomous vehicle and the surrounding objects.

At step 508, the autonomous vehicle processor transmits an input of a trajectory having a lowest cost value to a vehicle control module of the autonomous vehicle. In an embodiment, the vehicle control module is configured to apply the trajectory having the lowest cost value and other system inputs used in path planning to identify, evaluate, and modify the autonomous vehicle trajectory. The vehicle control module may include a steering controller for vehicle lateral motion control, a propulsion and braking controller for vehicle longitudinal motion, and other vehicle actuators.

In an example of method 500, when planning a path between two objects with similar collision costs, the autonomous vehicle processor split the difference evenly. If one target object represented less of a collision cost than the other, the autonomous vehicle processor would lean proportionally towards the target object that presented a less catastrophic collision scenario.

FIG. 6 shows execution steps of a processor-based method using the system 100, 250, 300 according to aspects of the present disclosure. The illustrative method 600 shown in FIG. 6 comprises execution steps 602, 604, 606, 608. However, it should be appreciated that other embodiments may comprise additional or alternative execution steps, or may omit one or more steps altogether. It should also be appreciated that other embodiments may perform certain execution steps in a different order. Steps may also be performed simultaneously or near-simultaneously with one another.

At step 602, the autonomous vehicle processor identifies a plurality of target objects in collision proximity to the autonomous vehicle. In an embodiment of step 602, the autonomous vehicle processor identifies objects within a region of interest (ROI) that satisfy predetermined criteria for likelihood of collision with the autonomous vehicle.

At step 604, the processor executes an artificial intelligence model to predict a plurality of predetermined attributes of each of the plurality of target objects relative to the autonomous vehicle. In an embodiment of step 604, the plurality of predetermined attributes of each of the target objects include a relative velocity of the respective target object relative to the autonomous vehicle and a mass attribute of the respective target object. In an embodiment, the artificial intelligence model is configured to ingest data from at least one sensor of the autonomous vehicle and predict the plurality of predetermined attributes of each of the target objects.

At step 606, the processor calculates a total cost value representing a total of respective cost values incurred from each of the plurality of target objects based on the plurality of predicted attributes. In an embodiment, the total cost value representing the total of respective cost values incurred from each of the plurality of target objects represents collision severity.

At step 608, the processor transmits to a vehicle control module of the autonomous vehicle an input of a vehicle pose having a lowest total cost value. In an embodiment, the vehicle control module is configured to apply the vehicle pose having the lowest cost value and other system inputs used in path planning to identify, evaluate, and modify the autonomous vehicle trajectory. The vehicle control module may include a steering controller for vehicle lateral motion control, a propulsion and braking controller for vehicle longitudinal motion, and other vehicle actuators.

In an embodiment, the method 600 includes the further step of determining a plurality of vehicle poses of the autonomous vehicle. Each vehicle pose of the plurality of vehicle poses may have a respective set of buffer distance margins between the autonomous vehicle and respective target objects of the plurality of target objects. In an embodiment, steps 604, 606 are repeated for each vehicle pose of the plurality of vehicle poses to execute the artificial intelligence model and to calculate the total cost for the respective vehicle pose. In an embodiment of step 608, the processor transmits an input of a vehicle pose selected from the plurality of vehicle poses, wherein the selected vehicle pose has a lowest total cost value of the calculated total cost values.

It should now be understood that an autonomously-capable vehicle may use data about the environment surrounding it to compare detected features with features stored on a map and make one or more alterations to the behavior of the vehicle based on differences between the detected features and the stored features. By detecting changes and gathering additional information about the changes, the vehicles can share information between themselves (e.g., via a central server) and operate more efficiently across a fleet of vehicles. Accordingly, the more efficient operation will result in a greater number of miles travelled and a better understanding of the roads on which the vehicles travel.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

What is claimed is:

1. A method comprising:
   receiving, by a processor associated with an autonomous vehicle, an indication that a current trajectory of the autonomous vehicle is associated with a likelihood of a collision that satisfies a threshold indicating a potential collision;
   identifying, by the processor, an alternative trajectory for the vehicle;
   when the alternative trajectory has a likelihood of collision that satisfies the threshold indicating a potential collision, calculating, by the processor, a cost value for the current trajectory and the alternative trajectory, wherein the cost value is based on a speed of a second vehicle associated with the potential collision; and
   transmitting, by the processor, an input of a trajectory having a lowest cost value to a vehicle control module of the autonomous vehicle.

2. The method of claim 1, wherein the cost value is further based on an attribute of an additional object associated with the potential collision.

3. The method of claim 2, wherein the attribute is at least one of a mass, volume, density, or material of the object.

4. The method of claim 2, further comprising:
   executing, by the processor, an artificial intelligence model to predict the attribute of the object, the artificial intelligence model configured to ingest data from at least one sensor of the autonomous vehicle and predict the attribute of the object.

5. A method comprising:
   identifying, by a processor associated with an autonomous vehicle, a plurality of target objects in collision proximity to the autonomous vehicle;
   executing, by the processor, an artificial intelligence model to predict a plurality of predetermined attributes of each of the plurality of target objects relative to the autonomous vehicle;
   calculating, by the processor, a total cost value representing a total of respective cost values incurred from each of the plurality of target objects based on the plurality of predicted attributes;
   determining, by the processor, a plurality of vehicle poses of the autonomous vehicle; and
   transmitting to a vehicle control module of the autonomous vehicle, by the processor, an input of a vehicle pose selected from the plurality of vehicle poses having a lowest total cost value.

6. The method of claim 5, wherein each vehicle pose of the plurality of vehicle poses has a respective set of buffer distance margins between the autonomous vehicle and respective target objects of the plurality of target objects.

7. The method of claim 5, further comprising repeating the executing step and calculating step for each vehicle pose of the plurality of vehicle poses.

8. The method of claim 7, wherein the lowest total cost value is a lowest total cost value of the calculated total cost values.

9. The method of claim 5, wherein the total cost value representing the total of respective cost values incurred from each of the plurality of target objects represents a collision severity.

10. The method of claim 5, wherein the plurality of predetermined attributes of each of the plurality of target objects comprise a relative velocity of a respective target object of the plurality of target objects relative to the autonomous vehicle and a mass attribute of the respective target object.

11. The method of claim 5, wherein the artificial intelligence model is configured to ingest data from at least one sensor of the autonomous vehicle and predict the plurality of predetermined attributes of each of the target objects.

12. The method of claim 5, wherein identifying the plurality of target objects in collision proximity to the autonomous vehicle comprises identifying objects within a region of interest (ROI) that satisfy predetermined criteria for likelihood of collision with the autonomous vehicle.

13. A system comprising:
a non-transitory computer-readable medium comprising instructions that are configured to be executed by at least one processor associated with an automated vehicle to:
receive an indication that a current trajectory of the autonomous vehicle is associated with a likelihood of a collision that satisfies a threshold indicating a potential collision;
identify an alternative trajectory for the vehicle;
when the alternative trajectory has a likelihood of collision that satisfies the threshold indicating a potential collision, calculate a cost value for the current trajectory and the alternative trajectory, wherein the cost value is based on a speed of a second vehicle associated with the potential collision; and
transmit an input of a trajectory having a lowest cost value to a vehicle control module of the autonomous vehicle.

14. The system of claim 13, wherein the cost value is further based on an attribute of an additional object associated with the potential collision.

15. The system of claim 14, wherein the attribute is at least one of a mass, volume, density, or material of the object.

16. The system of claim 14, wherein the at least one processor is further configured to execute an artificial intelligence model to predict the attribute of the object, the artificial intelligence model configured to ingest data from at least one sensor of the autonomous vehicle and predict the attribute of the object.

* * * * *